United States Patent [19]

Hara et al.

[11] Patent Number: 4,536,067
[45] Date of Patent: Aug. 20, 1985

[54] FILM PACK

[75] Inventors: Yoshio Hara; Yukihiro Sugimoto, both of Kanagawa, Japan

[73] Assignee: Fuji Photo Film Co., Ltd., Kanagawa, Japan

[21] Appl. No.: 549,520

[22] Filed: Nov. 7, 1983

[30] Foreign Application Priority Data

Nov. 8, 1982 [JP] Japan .................. 57-196495

[51] Int. Cl.³ ............................................ G03B 19/10
[52] U.S. Cl. .................................... 354/180; 354/185
[58] Field of Search ............................ 354/174–185, 354/83, 86, 275, 276; 221/268

[56] References Cited

U.S. PATENT DOCUMENTS

| | | | |
|---|---|---|---|
| 416,650 | 12/1889 | Stirn | 354/180 |
| 744,498 | 11/1903 | Darlington | 354/176 |
| 2,477,324 | 7/1949 | Wolff | 354/180 |
| 3,705,542 | 12/1972 | Gold | 354/180 |
| 3,741,095 | 6/1973 | Harvey | 354/86 |

Primary Examiner—L. T. Hix
Assistant Examiner—Douglas S. Lee
Attorney, Agent, or Firm—Sughrue, Mion, Zinn, Macpeak & Seas

[57] ABSTRACT

A film pack having a box-shaped case body containing instant picture film units therein includes a depressing unit for biasing the film unit toward an exposure opening of the film pack as well as local depressing members which urge peripheral portions of the film units toward the exposure opening. The biasing force of the local depressing members is substantially independent of the biasing force of the depressing unit, and the biasing force of the local depressing members varies with the number of film units remaining in the film pack, with the biasing force provided by the local depressing members being a maximum when the film pack is filled with film units.

8 Claims, 14 Drawing Figures

FILM PACK

BACKGROUND OF THE INVENTION

This invention relates to the field of photography, and more particularly to a film pack which accommodates instant picture film units.

An instant picture film unit film pack which produces no waste matters after image development and uses so-called mono-sheet type film units is described in Japanese Patent Laid-Open application No. 68828/1982 and is shown in FIGS. 1 and 2. The film pack comprises a box-shaped case body 2 which accommodates a predetermined number of film units 1, a depressing unit 5 having a depressing board 5' disposed within the case body 2 for biasing the film units 1 in the direction of arrow X (for exposure); and a light shielding cover 6 adapted to be discharged through a film unit discharging outlet 4, the outlet 4 forming a slit cut in one side of the case body 2. The case body 2 has an opening on its front, the opening being surrounded by a frame 3 and being used to expose the image forming region 21 of each film unit 1 as shown in FIGS. 3-a and 3-b.

The film unit 1 shown in the FIGS. 3-a and 3-b has a pod 23 at its front end which is positioned beside the film unit discharging outlet 4 when the film unit is in the film pack. The pod contains a processing solution for developing, etc., and is torn when pressed. The film unit further has a trap member 25 at its rear end. The image forming region 21 is surrounded by a frame 22 and is located between the trap member 25 and the pod 23. The trap member 25 incorporates a trap spacer 24 adapted to absorb excessive processing solution 33 which remains after the processing solution 33 has been spread between two sheets, namely, a photo-sensitive sheet 31 and a cover sheet 32.

The depressing unit in the conventional film pack serves to hold an image forming region 21 of a top film unit 1 at a suitable exposure position and to align a front end of the top film unit, where the pod 23 is located, with the slit-shaped discharging outlet 4.

FIG. 4 is a sectional view taken along line IV—IV in FIG. 1, showing how the film unit is discharged out of the film pack. After being exposed, the top film unit 1 in the film pack is pushed by a pushing unit 41 at a rear end of the film unit 1 where the trap member 25 for absorbing excessive processing solution is located. Accordingly, the front end of the film unit 1 where the pod 23 is located is fed between a pair of rolls 42. As a result, the pod is opened by the rolls and the processing solution is spread in the film unit to start developing while the film unit is discharged out of the camera. In order to prevent a plurality of film units from being discharged simultaneously, the clearance and position of the slit-shaped discharging outlet 4 is accurately determined according to the thickness and position of the pods 23 of the film units 1.

A picture taken with the above-described film units, film pack and camera sometimes lacks sharpness at a portion of a picture image forming region which is closer to the pod 23 at the front end of the film unit and/or at a portion of the image forming region which is closer to the trap member 25 at the rear end of the film unit 1. The inventors have found through analysis that this phenomenon is attributable principally to the fact that the film unit photosensitive surface is curved during a photographing operation. It has been also found that the lack of sharpness is more severe as the size of the film unit is increased. These difficulties may be overcome by using a camera lens system having a large depth of focus or by increasing the biasing force of the depressing plate 5' of the depressing unit 5.

In general, employment of a lens system having a large depth of focus results in an increase of the "F" value of the camera, thus not being desirable for an instant camera which normally already has a high "F" value.

On the other hand, increasing the elasticity or biasing force of the depressing unit 5 (FIG. 2) in the film pack and thus the depressing plate 5' as applied to the top film unit 1 so as to forcibly reduce the curvature of the top film unit also creates problems. Specifically, even if the biasing force is increased, the curvature of the top film unit is not reduced to the intent expected or required, and the force of friction between the top film unit 1 and the film pack opening frame 3 is excessively increased which obstructs smooth discharging of the top film unit. In addition, the increased frictional force increases the possibility of accidentally breaking and opening a pod of one of the lower ordered film units.

If the depressing plate 5' is brought into contact only with the image forming region 21 of the film units 1 as shown in FIG. 5 to increase the biasing force of the depressing plate, image sharpness is improved to some extent. However, in this case, the front end of the film unit 1, where the pod 23 is located, is shifted from the slit-shaped discharging outlet 4 of the film pack, and accordingly, the front end of the top film unit to be discharged is sometimes caught by the discharging outlet 4; that is, it is difficult to smoothly discharge the top film unit 1.

SUMMARY OF THE INVENTION

An object of this invention is to provide a film pack having biasing means which reduces the curvature of a top film unit especially near the front and rear ends of the film unit and which also properly aligns a pod of the top film unit with a slit-shaped discharging outlet of a film pack.

The foregoing object of the invention is achieved by the provision of a film pack having a main depressing unit 5, as shown in FIG. 5 and in FIG. 6, as well as additional local depressing members for biasing peripheral portions of an image forming region of said film units. The peripheral portions of the image forming region of the film units are located at the front end of the film unit located closest to the pod thereof and/or at the rear end of the film unit located opposite the front side thereof. The additional local depressing members bias these peripheral portions with a force whose magnitude is substantially independent of a force used to bias other portions of the image forming region.

BRIEF DESCRIPTION OF THE DRAWINGS

FIG. 3-b is a sectional view of the film unit in FIG. 3-a;

FIG. 8-b is a plan view of the mechanism shown in FIG. 8-a.

DESCRIPTION OF THE PREFERRED EMBODIMENTS

Figure 7:
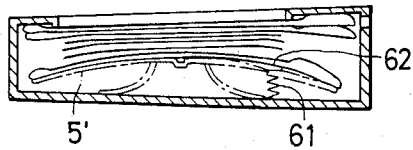
FIG. 7 is a sectional view of one embodiment of a film pack having local depressing members constructed according to the invention.

FIG. 7 shows a typical example of a film pack according to the invention. In FIG. 7, reference numeral 61 designates springs, or local depressing members. The ends of the springs 61 are connected to an abutment plate 62. The springs 61 apply a biasing force or a force of depression to the film unit which is independent of the biasing force provided by the depressing plate 5' (indicated by the one-dot chain line) of the conventional depressing unit.

The term "independent" as used herein is intended to mean that the biasing force or the force of depression provided by the local depressing members to the film unit can be selected substantially irrespective of the biasing force or force of depression provided by the conventional depressing unit to the film unit.

If the force of depression of the local depressing members or springs 61 applied to the film unit is excessively strong, as the photographing operation is repeated, i.e., the number of film units in the film pack is reduced, peripheral portions of the top film unit are locally pushed so that the curvature of the top film units is reduced. In practice, the biasing force of the springs 61 should be determined according to the rigidity of the film unit, and the size and configuration of the abutment plate 62 coupled to the movable ends of the springs, although the abutment plate 62 can be omitted in some embodiments.

According to the analysis made by the inventors, the curvature of the film unit 1 which is a photographing position (the top film unit) depends on the total number of film units remaining in the film pack. For instance, in the case of an "FI-10" film pack manufactured by Fuji Picture Film Co., (generally one film pack containing ten film units), the amount and degree of curvature is greatest when relatively many film units remain in the film pack). However, the top film unit can be maintained substantially flat even with the conventional depressing unit when the number of film units remaining in the film unit is relatively low, for example less than six in some cases.

The reason the conventional depressing unit 5 operates satisfactorily when there are relatively few film units in the film pack is believed to be attributable to the fact that the pod 23 has a thickness greater than other sections of the film unit. Accordingly, when film units are piled one on another, gaps are formed between the film units, especially at both end portions of each image forming region thereof, and therefore the biasing force of the depressing unit 5 is not sufficiently transmitted through the depressing plate 5' to the top film unit 1 which is at the photographing position.

Accordingly, it is desirable that a strong biasing force be applied to peripheral portions of the film units by the springs 61 when the number of film units remaining in the film pack is large, and that the biasing force of the springs 61 be reduced abruptly as the number of film units in the film pack is decreased. It is also desirable that the biasing force of the springs 61 be minimal or zero when the number of film units remaining in the film pack is less than four, or less than five as the case may be. That is, the local depressing members should make no positive contribution to the flatness of the image forming region near the front end and/or the rear end of the film unit when there are relatively few film units in the film pack.

Accordingly, the local depressing members 61 are designed according to a load-displacement characteristic which is represented by the position of the spring when no load is applied and the elastic constant of the spring. Simple and preferable concrete examples of the film pack constructed according to the present invention will now be described.

CONCRETE EXAMPLE 1

In this concrete example, when the number of film units remaining in the film pack is small, the biasing force of the local depressing members is neglible compared to the biasing force exerted by the conventional depressing unit. When the local depressing force is applied to the film unit, its point of action exists only at the front end portion of the image forming region which is closer to the pod whereat substantial film unit curvature is liable to require correction.

Figure 1:
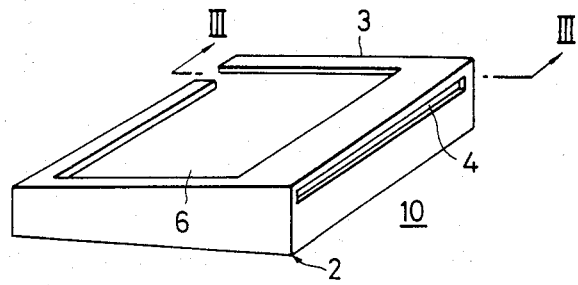
FIG. 1 is an external view of an ordinary instant picture mono-sheet type film pack.
Figure 2:
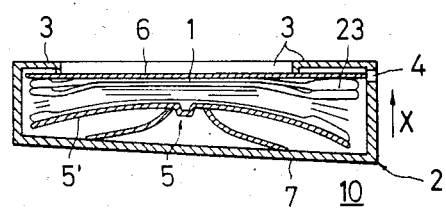
FIG. 2 is a sectional view of the film pack in FIG. 1.
Figure 8A:
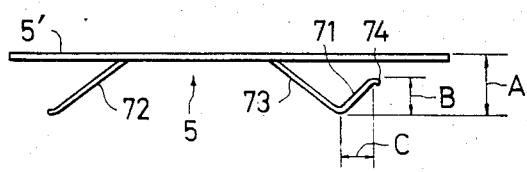
FIG. 8-a is a sectional view showing another embodiment of the local depressing members and depressing unit in the film pack according to the invention.
Figure 8B:
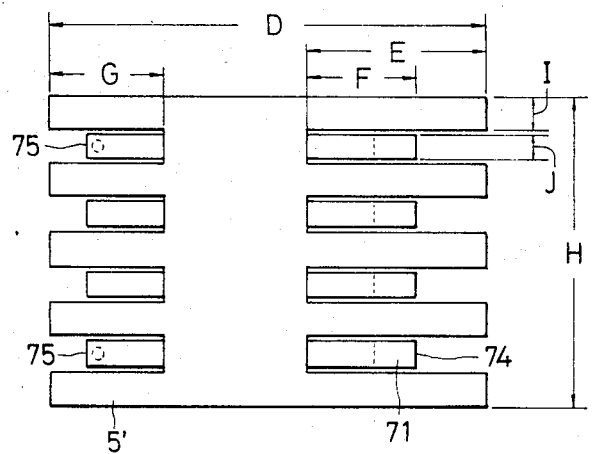

FIGS. 8-a and 8-b are a sectional view and a plan view, respectively, showing the conventional depressing unit 5 and local depressing members 71 in the film pack. The depressing unit has two spring legs 72 and 73, with spring leg 72 fixed to the bottom of the film pack and the other spring leg 73 being slidable on the bottom (reference numeral 7 in FIG. 2) of the film pack and being extended to form an end portion 74 which is adapted to locally depress the film unit. In FIGS. 8-a and 8-b, the dimensions of the depressing unit and the local depressing members 71, 74 are as follows: A=16 mm, B=11 mm, C=10 mm, D=146 mm, E=60 mm, F=35 mm, G=25 mm, H=99 mm, I=11 mm and J=9 mm. The plate thickness is 0.29 mm. The depressing members and the depressing unit are formed of an ordinary chemically processed steel. The elastic constant of one local depressing member 71, 74 is about 180 g/mm. Since four local depressing members 71, 74 are employed in the example, the elastic constant of all the local depressing members 71, 74 is about 720 g/mm.

Figure 3A:
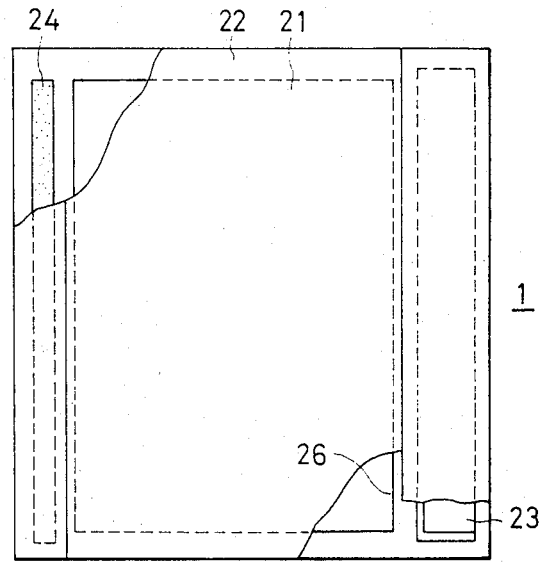
FIG. 3-a is a plan view of a mono-sheet type film unit.
Figure 3B:
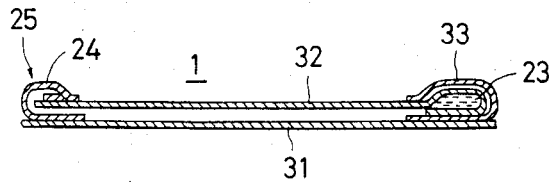
Figure 4:
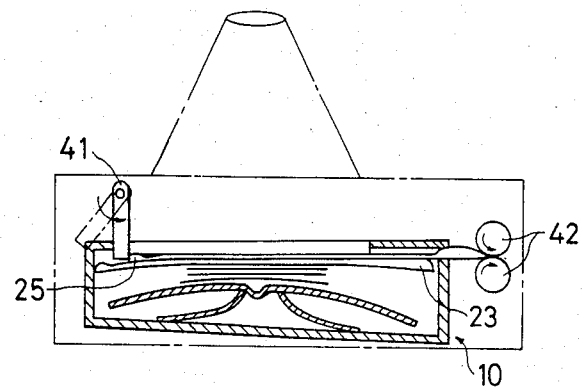
FIG. 4 is a sectional view taken along line IV—IV in FIG. 1, showing a film unit discharging mechanism.
Figure 6:
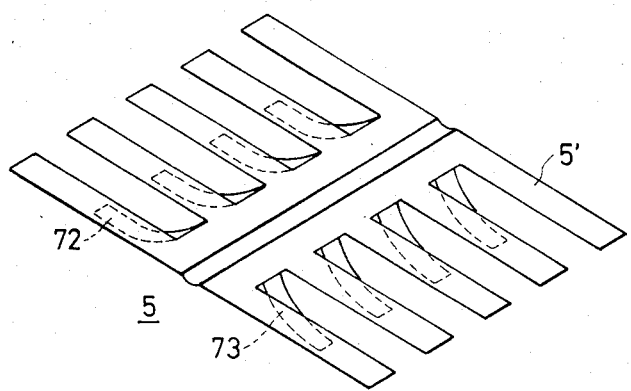
FIG. 6 is an external view of a depressing unit.
Figure 5:
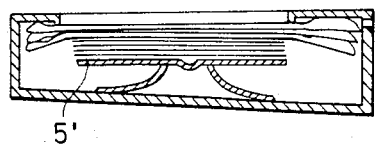
FIG. 5 is a sectional view of another example of the conventional film pack in which a depressing unit depresses only the image forming region of the film unit through a depressing plate.
Figure 9:
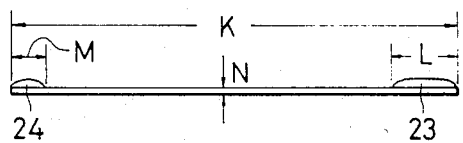
FIG. 9 is an explanatory diagram for a description of the dimensions of the film units in concrete examples 1 and 2 of the invention.

FIG. 9 is a sectional view of the film unit in the concrete example. The dimensions are as follows: K=150 mm, L=22 mm, M=12 mm and N=0.5 mm. When ten film units are piled one on another under the force of depression, the sum of the thicknesses of the pods is 15 mm, the sum of the thicknesses of the traps is 12 mm, and the sum of the thicknesses of the image forming regions is 5 mm. Other configurations and materials are similar to those of the film unit shown in FIG. 3 and disclosed in Japanese Patent application Laid-Open No. 68828/1982.

Figure 10A:
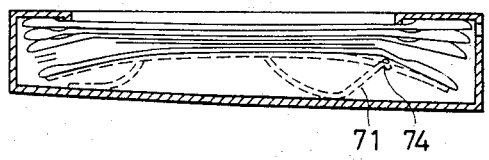
FIGS. 10-a and 10-b are sectional views showing how the depressing unit and the local depressing members work as the number of film units remaining in the film pack changes in concrete example 1.
Figure 10B:
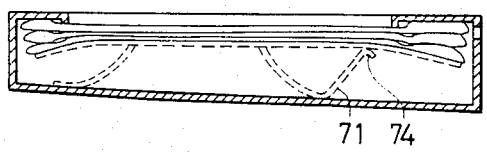

FIG. 10-a shows the states of the conventional depressing unit (indicated by the broken line) and the local depressing members (shaded in black) in the film pack when ten film units are in the film pack (similar to a film pack which is commercially available at present), and FIG. 10-b shows the states of the conventional depressing unit and the local depressing members when three film units remain in the film pack.

In FIG. 10-a, the end portion 74 of each local depressing member depresses the image forming region at about 5 cm from the boundary (reference numeral 26 in FIG. 3-a) of the image forming region according to its elastic constant. On the other hand, in FIG. 10-b, the end portion 74 is merely in contact with the film unit, applying substantially no force of depression to the film unit.

Table 1 below shows how the flatness of the photosensitive surface (which is the exposure surface of the cover sheet 32 in FIG. 3-b) of the top film unit at the photographing position is improved with the film pack constructed according to the present invention.

TABLE 1

| The number of film units remaining | 10 | 7 | 5 | 3 | 1 |
|---|---|---|---|---|---|
| Conventional film pack | 2573 | 1760 | 1624 | 1083 | 948 |
| Concrete example 1 | 948 | 948 | 1083 | 948 | 812 |
| Concrete example 2 | 1083 | 1083 | 948 | 1083 | 948 |

In Table 1, the numerical values are those which have been measured according to the moire method, each value being the difference in level in $\mu$m between two portions of the image forming region of the film unit at the photographing position, which are curved, respectively, most inwardly and outwardly.

Thus, the film pack having the novel local depressing members according to the invention is more effective when more than four film units remain in the film pack, and the effect becomes significant as the number of film units remaining in the film pack increases.

CONCRETE EXAMPLE 2

Figure 11:
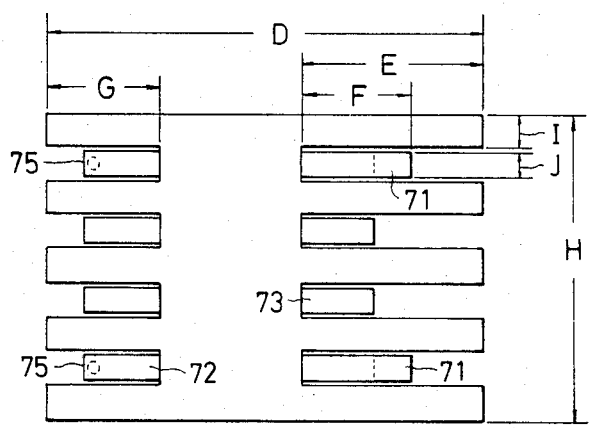
FIG. 11 is a plan view of a depressing unit and local depressing members in concrete example 2.

Concrete Example 2 is similar to the above-described Concrete Example 1 except that, instead of the local depressing members having four points of action as shown in FIG. 8-b, local depressing members having two points of action as shown in FIG. 11 are employed. In Concrete Example 2 also, the flatness of the image forming region is improved as indicated in Table 1, with a result which is substantially the same as that of Concrete Example 1.

As is apparent from the above description, according to the invention, by merely providing relatively simple local depressing members in the film pack in such a manner that the local depressing members act independent of the conventional depressing unit, the curvature of a film unit to be exposed can be reduced significantly especially when the number of film units remaining in the film pack is large. Therefore, sharper pictures can be made which allows the film size to be increased and/or the depth of focus to be decreased. These facts are not only effective in designing cameras but are also advantageous for instant picture systems.

While the invention has been described in detail and with reference to specific embodiments thereof, it will be apparent to one skilled in the art that various changes and modifications can be made therein without departing from the spirit and scope thereof.

We claim:

1. A film pack, comprising:
   a box-shaped case body containing instant picture film units, supporting means for partially supporting said film units, said case body having an opening for exposing an image forming region of each film unit and a discharging outlet for discharging exposed film units therefrom;
   first biasing means integrally formed with said supporting means, said first biasing means located in said case body urging said film units toward said opening with a first biasing force; and
   second biasing means located in said case body urging a localized portion of said image-forming region of each film unit toward said opening with a second biasing force, said second biasing force being substantially independent of said first biasing force.

2. The film pack as claimed in claim 1, wherein said portion urged by said second biasing means comprises a peripheral portion of said image-forming region of said film units.

3. The film pack as claimed in claim 2, wherein said peripheral portion includes at least one of a portion of said image-forming region at a front end of said film units in a vicinity of a pod located thereon and a portion of said image-forming region at a rear end of said film units opposite said pod.

4. The film pack as claimed in claim 3, wherein said second biasing force varies with a number of film units in said film pack, said second biasing force decreasing as a number of said film units in said film pack decreases.

5. The film pack as claimed in claim 4, wherein said second biasing means comprises at least one spring, and further comprising an abutment plate coupled to a movable end of said at least one spring, said abutment plate being adjacent to a lowermost film unit in said film pack.

6. The film pack as claimed in claim 4, wherein said second biasing means is integrally formed with said first biasing means.

7. The film pack as claimed in claim 3, wherein said peripheral portion consists of said portion of said image-forming region at said front end of said film units.

8. The film pack as claimed in claim 6, wherein said first and second biasing means comprise a spring having first and second spring legs in contact with a bottom surface of said film pack, one of said spring legs being fixed to said surface and the other of said spring legs being slidable thereon.

* * * * *